United States Patent Office 3,441,552
Patented Apr. 29, 1969

3,441,552
ANTISTATIC COMPOSITION
Konrad Rombusch and Ursula Eichers, Marl, Germany, assignors to Chemische Werke Huls, A.G., Marl, Germany
No Drawing. Filed Sept. 30, 1966, Ser. No. 583,417
Claims priority, application Germany, Oct. 9, 1965, C 37,116
Int. Cl. C08d 3/04; C09k 3/16
U.S. Cl. 260—93.7                 8 Claims The present invention relates generally to a process of treating polyolefin resins to minimize or eliminate the accumulation of electrostatic charges.

It is known that plastic articles, in particular those made of polyolefins, can be rendered antistatic by treating the external surface thereof with an antistatic agent. The protection against the accumulation of electrostatic charges obtained in this manner lasts only until the applied thin layer of the antistatic agent is worn or peeled off. Therefore, it is preferred to incorporate into and as an integral part of the polyolefin compositions, before they are molded, suitable additives, such as hydroxyethylates of alkanols and alkylaryl phenols (Belgian Patent No. 536,623 and British Patent No. 731,728, respectively).

Moreover, there is disclosed in co-pending United States patent application Ser. No. 525,852, filed Feb. 8, 1966 the use of N-hydroxyalkylates (aliphatic alcohols) of alkoxypropylamines as antistatic agents for polyolefin resins.

When most of the conventional antistatic agents are incorporated into polyolefins in amounts sufficient to obtain the desired destaticizing effect, the resultant protection turns out to be only temporary since the agent tends to sweat or seep out of the substrate in an undesired manner. A more satisfactory reduction in the static propensity of polyolefins can be obtained with hydroxyethylates of alkylamines and fatty acid amides (Belgian Patent No. 645,800 and French Patent No. 1,322,626, respectively). To effectively destaticize polyolefins, particularly articles molded from highly crystalline and/or highly isotactic polyolefins, it is necessary to use relatively large amounts of antistats which will begin to seep to the surface of the article in the form of an oily layer after relatively short residence periods. Moreover, the ubiquitous distribution of relatively high concentrations of the antistat in the resin very often deleteriously affects the mechanical behavior of the resultant composition during subsequent shaping and forming operations thereof. For this reason, it is desirable to incorporate into polyolefins an antistat which effectively eliminates the accumulation of electrostatic charges without deleteriously impairing the physical properties thereof.

It is therefore a principal object of this invention to provide an improved treatment of polyolefins to prevent the accumulation of static electricity thereon.

It is another object of this invention to provide an improved treatment of polyolefins which will impart permanent antistatic protection thereto.

It is yet another object of this invention to provide a method of imparting improved antistatic protection to polyolefins with an antistat which can be used in relatively low concentrations therein.

It is still another object of this invention to provide for polyolefins a new class of antistatic agents which will not deleteriously affect the physical properties thereof.

It is another object of this invention to provide for polyolefin materials a class of antistatic agents which will not seep or sweat out of the material and which will remain in an active and effective state over long periods of time.

These and other objects and advantages of the invention will become apparent by reference to the following description and claims appended hereto.

It has been surprisingly discovered that polyolefin masses can be endowed with excellent antistatic properties by incorporating therein an antistatically effective amount of preferably from 0.01 to 4%, more preferably 0.1 to 1.0% by weight of an alkoxypropylamine of the formula:

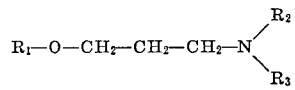

wherein:

R₁ represents an alkyl, alkenyl, alkylcycloalkyl, aryl, alkylaryl, or alkenylaryl group of 6–25, preferably 8 to 18 carbon atoms in the alkyl or alkenyl moieties and 4 to 18, preferably 6 to 12 carbon atoms in the cycloalkyl moiety, and 6 to 14, preferably 6 to 10 carbon atoms in the aryl moiety.

R₂ and R₃ can each represent a hydrogen atom, or an alkyl or alkenyl group of 1 to 5 carbon atoms.

These compounds can be used by themselves or in mixture with other antistatically effective compounds.

It is preferred to employ as R₁ a saturated or unsaturated straight-chain or branched alkyl, alkylcycloalkyl, or alkylaryl group of 6–25, preferably 8–14 carbon atoms in the alkyl group, or an aryl group. Suitable as the R₁ are, for example, the following residues: hexyl, n-octyl, ethylhexyl, n-nonyl, n-dodecyl, n-tetradecyl, i-tetradecyl, hexadecyl, oleyl, n-octadecyl, nonylcyclohexyl, i-nonylphenyl, n-dodecylphenyl, i-dodecylphenyl, n-octadecylphenyl, or mixtures thereof, such as a mixture of C₁₂–C₁₈ fatty alcohols, phenyl, iso-octylphenyl, naphthyl, pentenylphenyl, octenylphenyl.

Preferred residues are: 2-ethylhexyl, decyl, undecyl, n-dodecyl, tridecyl, and tetradecyl.

R₂ and R₃ can both be hydrogen or they can be alkyl or alkenyl moieties such as methyl, ethyl, propyl, butyl, pentyl, and the unsaturated derivatives thereof such as butenyl. If R₂ and R₃ both are alkyl or alkenyl moieties, they are identical.

Particularly suitable of the above-described antistatic agents are, for example, n-octadecyloxypropyl-N-methylamine, sec - tetradecyloxypropylamine, n - docecyloxypropyl-N,N-dimethylamine, 2-ethylhexyloxypropyl-N,N-dimethylamine, n-octadecenyloxypropyl-N-pentylamine, n-dodecyloxypropylamine, n-dodecyloxypropyl - N - ethylamine, n-octadecyloxypropyl-N,N-dimethylamine, n-octadecenyloxypropylamine or mixtures thereof, such as a mixture of C₁₂–C₁₈ fatty alcyloxypropylamine, iso-nonylphenyloxypropylamine.

The alkoxypropylamines are obtained, for example, by the addition of corresponding hydroxy compounds, such as, for example, alkanols, alkenols, alkyl phenols, to acrylonitrile, followed by hydrogenation of the cyano group to the amine. The resulting alkoxypropylamines can then be alkylated, for example, by means of formaldehyde in the presence of formic acid (Eschweiler reaction), or by the reaction of the amine with formaldehyde and hydrogen in the presence of a hydrogenation catalyst. Alkylation can also be accomplished using higher oxo compounds to obtain N-alkyl derivatives having a higher number of carbon atoms.

The above-described methods of preparing the antistatic compounds of the invention do not always produce only one lone species thereof, but instead, there is often obtained a mixture of homologs. These homologs differ with respect to the number of carbon atoms in the alkyl groups. In terms of protection afforded against the accumulation of static electricity, these chemical differences are, however, normally of little importance, and the compounds of the present invention provide effective destatization of polyolefins.

It is also desirable to employ a mixture of the same or different species of these new antistatic agents. In fact, effective destatization of polyolefins is obtained when one or several of the substituents $R_1$, $R_2$ or $R_3$ differ.

The foregoing antistatic additives are added to one or more polymers of an olefin having 2–8 carbon atoms, for example, high-pressure and low-pressure polymers of ethylene, propylene, butene-(1), pentene-(1), 4-methylpentene-(1), or octene-(1), or other mono-α-ethylenically unsaturatd hydrocarbons. Copolymers thereof, such as ethylene-propylene are also included.

In general, the invention is useful with all normally solid polyolefins.

The antistatic agents of this invention can be incorporated into polyolefins in various ways. For example, the antistatic agent can be added to polyolefin particles and the resulting material mixed to form a homogeneous mass. For this purpose, generally any commercially available high-speed mixer is suitable. The polyolefin can also be mixed first with a greater amount of the antistatic agent than desired and the composition of this mixture subsequently adjusted by the admixture of additional polyolefin therewith. It is also possible to incorporate the antistatic agent into the polyethylene directly on the mill or, for example, in case of injection molding, in an extruder. It is also desirable to mix the antistatic agent dissolved, dispersed, suspended, or emulsified in a suitable organic solvent with polyethylene powder. Thereafter, the solvent can be removed, for example, by heating the polymer to vaporize the solvent. A solvent well suited for these purposes is, for example, methanol, ethanol, dioxane, acetone, water and aqueous solutions of such organic solvents.

However, all other easily distillable solvents are suitable for this purpose.

Advantageously, other conventional agents used in polyolefins such as for example pigments, coloring materials, stabilizers, mold release agents, plasticizers, and fillers, can be added to the polyolefins with the antistatic agent. If desired, one or more conventional antistatic agents can be employed together with the novel antistat of this invention.

Although a finite quantity of the antistatic agent of this invention provides a finite reduction in the accumulation of static electricity in polyolefins, the antistatic agent desirably constitutes 0.1 to 4.0% by weight, preferably 0.1 to 1.0% by weight of the polyolefin. Polyolefin articles thus prepared, and particularly those used in the household or in warm dry air, are provided with protection against the deposit of dust due to electrostatic charges on the surface of the article. Generally, the protection against electrostatic charging decreases with decreasing concentrations of the antistatic agent and when the concentration is below 0.05%, the antistatic protection may not completely prevent the deposition of dust on the surface of the polyolefin article. On the other hand, concentrations of the agent higher than 4% generally afford little improvement in the antistatic protection over and above the effective destaticization provided by using from 0.1 to 4% by weight of the antistat.

Polyolefins containing these antistatic agents can be utilized in the production of articles by any of the conventional shaping methods. For example, a polyolefin containing the antistatic agent can be formed into foils by blowing or rolling, fibers by drawing, or other articles shaped by injection compression molding processes. Products produced by these conventional shaping operations are described in the appended claims as mechanically shaped objects.

Molded polyolefin articles treated with the antistatic agents of this invention unexpectedly exhibit up to and including a hundredfold improvement in the surface resistance values, e.g., lower by up to two powers of ten, over the prior art, hydroxyethylated alkylamines and hydroxyethylated alkanols. In view of the higher potency and effectiveness of the present antistatic agents in comparison to conventional antistats, satisfactory destaticization of polyolefins can now be attained with significantly smaller amounts of the agent. In addition to the economy afforded by the use of smaller amounts of the present agent, the disadvantages normally attendant the use of the conventional agents, i.e., migration or sweating of the agent, and the impairment of the mechanical properties and processability of the molded masses, are eliminated. A further advantage of incorporating the agents of this invention into polyolefins is that the longevity of the antistatic protection is extended and is more permanent than heretofore obtainable with the prior art agents.

To determine the antistatic effect of the present agents on molded polyolefin masses containing the same, the surface resistance is measured according to DIN (German Industry Standard) 53 482–DVE 0303, Part 3; and the dissipation of the charges is also tested using the rotating field strength measuring device of Schwenkhagen [see M. Bühler, "Textilpraxis" (Textile Practice) 12/11, page 1147 (1957)]. The measurements are conducted on square molded bodies of polyolefin having a thickness of 1 mm. and an edge length of about 150 mm. In each of these tests, the surface resistance of the plate is measured at 22° C. and 40% relative humidity after the surface of the plates has been charged by vigorous rubbing with a dry cotton cloth. The surface of the resulting charged plate is then positioned a distance of 0.3 cm. directly over finely powered cigarette ashes to determine whether the magnitude of the charge on the surface is sufficient to attract the ashes. The test is labeled positive if the molded body does not attract any ash particles.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

80 g. n-dodecyloxypropyl-N-methylamine are dissolved in 2 l. methanol; the solution is stirred with 10 kg. polyethylene, and the solvent removed by evaporation. From the remaining mixture, both pressed and injection-molded plates are produced, and the antistatic effectiveness thereof is measured as described above. Even after vigorous rubbing of these plates with a dry cotton cloth, they do not attract dust, while similar plates of polyethylene strongly attract dust.

Example 2

100 g. of octadecyloxypropyl-N,N-dimethylamine are homogenized in a high-speed blender with 10 kg. polypropylene. After the resulting mixture is granulated and both pressed and injection-molded plates are produced therefrom, the effect of the antistat is tested. After rubbing with a dry cotton cloth, the molded plates do not attract any dust.

Example 3

100 g. ethylbutyloxypropylamine are homogenized in a high-speed blender with 10 kg. polybutene-(1). From the resultant mixture, both pressed and injection-molded plates are produced, and the antistatic effectiveness thereof is tested. After rubbing with a dry cotton cloth, the plates do not attract any dust.

After extended periods of storage, several measurements of the surface resistance of polyolefins treated with the antistats of the present invention were made to determine what, if any, loss of antistatic protection occurred by aging. The results of these aging tests, together with the values of the surface resistivity obtained immediately after the articles were produced are shown in Examples 4 to 6, 9 to 11, 14 and 15, of Table 1. Further, Examples 7, 8, 12, 13, and 16 show the surface resistance (measured during corresponding periods of storage) of several polyolefins treated with the prior art antistatic agents.

From the results shown in Table 1, it can be seen that treatment of polyolefins with the antistats of this invention provides a considerable improvement over conventional antistatic agents with respect to the surface resistance and/or the permanence of the antistatic effectiveness.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

2. The antistatic composition of claim 1 wherein said polymer is selected from the group consisting of polyethylene, polypropylene, polybutene-(1), polypentene-(1), and poly-4-methyl-pentene-(1); and the alkoxypropylamine constitutes from 0.1 to 4% by weight of the composition.

3. The antistatic composition of claim 1 wherein said alkoxypropylamine is selected from the group consisting of n-octadecyloxypropyl-N-methylamine, sec.-tetradecyloxypropylamine, n-dodecyloxypropyl - N,N - dimethylamine, 2-ethylhexyloxypropyl-N,N-dimethylamine, and n-octadecenyloxypropyl-N-pentylamine.

4. The antistatic composition of claim 2 wherein said alkoxypropylamine is selected from the group consisting of n-octadecyloxypropyl-N-methylamine, sec.-tetradecyloxypropylamine, n-dodecyloxypropyl - N,N - dimethylamine, 2-ethylhexyloxypropyl-N,N-dimethylamine, and n-octadecenyloxypropyl-N-pentylamine.

5. An article of manufacture being a mechanically shaped object consisting essentially of a composition as defined by claim 1.

6. An article of manufacture being a mechanically shaped object consisting essentially of a composition as defined by claim 2.

TABLE 1

| | | | Surface resistance [MΩ] at 40% relative humidity and 22° C., 1 part of additive per 100 parts of polyolefin | | | |
|---|---|---|---|---|---|---|
| Example | Polyolefin | Antistatic agent | Directly after the production of the pressed plate | About 4 months thereafter | About 1 year thereafter | Remarks, antistatic effectiveness |
| 4 | Polyethylene | Ethylhexyloxypropyl-N-methyl-amine | $3.10^3$ | $6.10^3$ | $8.10^3$ | Very good. |
| 5 | do | n-Decyloxypropylamine | $5.10^3$ | $8.10^3$ | $1.10^4$ | Do. |
| 6 | do | n-Dodecyloxypropyl-N,N-dimethylamine | $5.10^3$ | $7.10^9$ | $9.10^9$ | Do. |
| 7 | do | For comparison: n-Dodecanol+5 mols ethyleneoxide. | $5.10^3$ | $8.10^5$ | $6.10^6$ | Poor. |
| 8 | do | For comparison: n-Hexadecylamine+2 mols ethyleneoxide. | $1.10^4$ | $5.10^4$ | $1.10^5$ | Medium. |
| 9 | Polypropylene | n-Dodecyloxypropyl-N-methylamine | $3.10^3$ | $7.10^3$ | $9.10^3$ | Very good. |
| 10 | do | n-Hexadecyloxypropylamine | $8.10^3$ | $9.10^3$ | $9.10^3$ | Do. |
| 11 | do | Oleyloxypropyl-N,N-dimethylamine | $5.10^3$ | $7.10^3$ | $9.10^3$ | Do. |
| 12 | do | For comparison: n-Dodecanol+7 mols ethyleneoxide. | $3.10^5$ | $4.10^5$ | $8.10^5$ | Poor. |
| 13 | do | For comparison: n-Octadecylamine +2 mols ethyleneoxide. | $8.10^4$ | $1.10^5$ | $3.10^5$ | Medium. |
| 14 | Polybutene-(1) | 2-ethylhexyloxypropylamine | $3.10^3$ | $1.10^4$ | $5.10^4$ | Good. |
| 15 | do | n-Dodecyloxypropyl-N,N-dimethylamine | $2.10^3$ | $5.10^3$ | $7.10^3$ | Very good. |
| 16 | do | For comparison: n-Dodecanol+5 mols ethyleneoxide. | $4.10^4$ | $7.10^4$ | $8.10^4$ | Medium. |

What is claimed is:

1. An antistatic composition comprising a normally solid polymer of an α-ethylenically unsaturated hydrocarbon having 2–8 carbon atoms and an antistatically effective amount of an alkoxypropylamine of the formula:

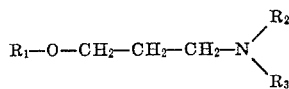

$$R_1-O-CH_2-CH_2-CH_2-N\begin{matrix}R_2\\R_3\end{matrix}$$

wherein
 $R_1$ represents an alkyl, alkenyl, alkylcycloalkyl, aryl, alkylaryl, or alkenylaryl group of 6–25 carbon atoms in the alkyl or alkenyl group, 4 to 18 carbon atoms in the cycloalkyl moiety, and 6 to 14 carbon atoms in the aryl moiety, and
 $R_2$ and $R_3$ each represents a hydrogen atom, or an alkyl or alkenyl of 1 to 5 carbon atoms.

7. An article of manufacture being a mechanically shaped object consisting essentially of a composition as defined by claim 3.

8. An article of manufacture being a mechanically shaped object consisting essentially of a composition as defined by claim 4.

References Cited

UNITED STATES PATENTS 2,959,567   11/1960   Pfeifer.

FOREIGN PATENTS 820,541   9/1959   Great Britain.

JOSEPH L. SCHOFER, *Primary Examiner.*

L. EDELMAN, *Assistant Examiner.*

U.S. Cl. X.R.

260—94.9, 88.2